US012726304B2

(12) United States Patent
Takahashi

(10) Patent No.: US 12,726,304 B2
(45) Date of Patent: Sep. 1, 2026

(54) COMMUNICATION APPARATUS, BASE STATION, AND COMMUNICATION METHOD

(71) Applicants: DENSO CORPORATION, Kariya-city (JP); TOYOTA JIDOSHA KABUSHIKI KAISHA, Toyota (JP)

(72) Inventor: Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 18/476,066

(22) Filed: Sep. 27, 2023

(65) Prior Publication Data

US 2024/0022370 A1 Jan. 18, 2024

Related U.S. Application Data

(63) Continuation of application No. PCT/JP2022/016489, filed on Mar. 31, 2022.

(30) Foreign Application Priority Data

Mar. 31, 2021 (JP) ................................ 2021-060034

(51) Int. Cl.
*H04L 5/00* (2006.01)
*H04W 72/23* (2023.01)
*H04W 72/51* (2023.01)

(52) U.S. Cl.
CPC ........... *H04L 5/0048* (2013.01); *H04W 72/23* (2023.01); *H04W 72/51* (2023.01)

(58) Field of Classification Search
CPC ...... H04L 5/0048; H04L 5/001; H04W 72/23; H04W 72/51; H04W 56/001; H04W 48/12
See application file for complete search history.

(56) References Cited

U.S. PATENT DOCUMENTS 12,057,927 B2 * 8/2024 Lovlekar .............. H04J 11/0073
12,075,273 B2 8/2024 Zhang et al.
(Continued)

FOREIGN PATENT DOCUMENTS

CN 114698107 A * 7/2022 ............ H04W 72/53
EP 3522598 A1 * 8/2019 ............ H04W 72/51
(Continued)

OTHER PUBLICATIONS

Nokia et al., "On Remaining Details of BWPs", Document R1-1804762, 3GPP TSG-RAN WG1 Meeting #92bis, Apr. 16-20, 2018.
(Continued)

*Primary Examiner* — Sujoy K Kundu
*Assistant Examiner* — Vladislav Y Agureyev
(74) *Attorney, Agent, or Firm* — Harness, Dickey & Pierce, P.L.C.

(57) ABSTRACT

A communication apparatus according to an aspect of the present disclosure comprises: a communicator configured to receive, from a base station, information indicating an absolute radio frequency channel number of a synchronization signal and a physical broadcast channel block (SSB) together with information indicating a dedicated parameter used for communication in a downlink bandwidth part; and a controller configured to perform measurement using the SSB based on the information indicating the absolute radio frequency channel number.

9 Claims, 6 Drawing Sheets

(56) References Cited

U.S. PATENT DOCUMENTS

2018/0192314 A1* 7/2018 Takahashi ............. H04W 16/32
2019/0182716 A1 6/2019 Futaki et al.
2019/0230550 A1 7/2019 Yiu
2019/0306915 A1* 10/2019 Jin ........................ H04W 76/28
2020/0045671 A1* 2/2020 Hapsari ................. H04W 76/28
2020/0053583 A1 2/2020 Määttänen et al.
2020/0169340 A1* 5/2020 Hwang ................ H04B 17/327
2020/0296656 A1* 9/2020 Amuru .................. H04L 1/1607
2020/0296674 A1* 9/2020 Kang .................... H04W 52/08
2020/0344761 A1* 10/2020 Amuru ................ H04L 27/2607
2020/0383103 A1* 12/2020 Zhou ..................... H04L 5/0064
2021/0058879 A1* 2/2021 Geng .................... H04L 5/0048
2021/0176656 A1* 6/2021 Sang ................... H04W 36/302
2021/0185553 A1* 6/2021 Shi ........................ H04L 5/0053
2021/0204231 A1* 7/2021 Harada ................. H04L 5/0048
2021/0329507 A1* 10/2021 Yao ................... H04W 36/0085
2022/0046690 A1* 2/2022 Lee ......................... H04W 4/08
2022/0052828 A1* 2/2022 Yiu ....................... H04L 5/0098
2022/0104109 A1* 3/2022 Lei ........................ H04W 48/14
2022/0116809 A1* 4/2022 Cheng ................. H04W 56/001
2022/0174509 A1* 6/2022 Noh .................... H04W 56/001
2022/0217561 A1* 7/2022 Geng .................. H04W 64/003
2022/0322381 A1* 10/2022 Zhang ................... H04W 72/23
2022/0394533 A1* 12/2022 Jin ........................ H04W 24/10
2023/0053304 A1* 2/2023 Thomas ................ G01S 5/0236
2023/0129299 A1* 4/2023 Ohara ............... H04W 74/0841
370/329
2023/0232313 A1* 7/2023 Ji ......................... H04J 11/0053
370/329
2024/0063959 A1* 2/2024 Liu ....................... H04L 5/0051

FOREIGN PATENT DOCUMENTS

EP 4024903 A1 * 7/2022 ........... H04W 4/029
EP 4046431 B1 * 2/2024 .......... H04L 5/0092
KR 20220014404 A * 2/2022 .......... H04J 11/0069
WO WO-2019092944 A1 5/2019
WO WO-2019196933 A1 * 10/2019 ........... H04W 48/12
WO WO-2019224871 A1 * 11/2019 ........... H04W 72/23
WO 2020001502 A1 1/2020
WO WO-2021030804 A1 * 2/2021 ........... H04W 72/23
WO WO-2021161485 A1 * 8/2021 ........ H04W 72/0453

OTHER PUBLICATIONS

3GPP TS 38.331 V16.3.1 (Jan. 2021), 3rd Generation Partnership Project; Technical Specification Group Radio Access Network; NR; Radio Resource Control (RRC) protocol specification (Release 16), Jan. 2021, pp. 1-937.

Intel Corporation, “Corrections to NR mobility measurements”, R1-1808666, 3GPP TSG RAN WG1 Meeting #94, Gothenburg, Sweden, Aug. 20-24, 2018, pp. 1-6.

R1-2100034, “UE complexity reduction for RedCap”, Ericsson, pp. 1-13.

R1-2100230, “Potential solutions for UE complexity reduction”, Huawei, HiSilicon, pp. 1-8.

R1-201214, “UE complexity reduction”, Samsung, pp. 1-9.

R1-2101766, “Complexity Reduction for RedCap Devices”, Qualcomm Incorporated, pp. 1-13.

R1-2100165, “Discussion on UE complexity reduction”, OPPO, pp. 1-10.

R1-2100499, “UE complexity reduction”, Nokia, Nokia Shanghai Bell, pp. 1-7.

3GPP TS 38.300, V16.5.0 (Mar. 2021), 3rd Generation Partnership Project; Technical Specification Group Radio Access Network; NR; NR and NG-RAN Overall Description; Stage 2 (Release 16), pp. 1-151.

3GPP TS 38.331 V16.4.1 (Mar. 2021), 3rd Generation Partnership Project; Technical Specification Group Radio Access Network; NR; Radio Resource Controll (RRC) protocol specification (Release 16), pp. 1-181.

RP-182566, “On channel bandwidth signalling”, Huawei HiSilicon, pp. 1-14.

R2-2110773, “Use of NCD-SSB instead of CD-SSB for RedCap Ues”, Ericsson, pp. 1-7.

* cited by examiner

COMMUNICATION APPARATUS, BASE STATION, AND COMMUNICATION METHOD

CROSS-REFERENCE TO RELATED APPLICATIONS

The present application is a continuation application of International Patent Application No. PCT/JP2022/016489, filed Mar. 31, 2022, which designated the U.S., and claims the benefit of priority to Japanese Patent Application No. 2021-060034, filed on Mar. 31, 2021. The entire disclosures of the above applications are incorporated herein by reference.

TECHNICAL FIELD

The present disclosure relates to a communication apparatus, a base station, and a communication method used in a mobile communication system.

BACKGROUND ART

In a fifth generation (5G) mobile communication system (5G system), communication between user equipment and a base station using a bandwidth part (BWP) that is a subset of a total bandwidth of a cell is defined. The user equipment performs communication by using a BWP (hereinafter, active BWP) used for communication with the base station. In the user equipment, a plurality of the BWPs can be configured for each of a downlink communication BWP (hereinafter, a downlink BWP) and an uplink communication BWP (hereinafter, an uplink BWP). The user equipment switches and uses the active BWP in a case where the plurality of BWPs is configured.

The base station transmits a synchronization signal and a physical broadcast channel block (hereinafter, SSB) that are used by the user equipment to measure radio quality. The user equipment performs measurement based on the SSB received from the base station, and uses a measurement result for communication control with the base station.

In recent years, in 3GPP which is a mobile communication system standardization project, it has been studied to provide user equipment (so-called Reduced capability NR device) with limited communication capability in a 5G system. Since such user equipment does not have a plurality of receivers, it is not possible to perform measurement on the SSB transmitted at a frequency other than the BWP during communication in the BWP. Therefore, it is conceivable to configure the BWP in which the SSB is transmitted to the user equipment with limited communication capability. However, since the BWPs in which SSBs are transmitted are limited, traffic congestion may occur due to a large number of user equipment concentrating on such limited active BWPs.

Therefore, in order to avoid traffic congestion, it is desirable to be able to configure a BWP in which no SSB is transmitted in the total bandwidth in the user equipment (See, for example, Non Patent Literature 1.). Even in user equipment in which a BWP in which an SSB is not transmitted is configured, it is possible to receive an SSB transmitted at a frequency other than the active BWP and perform measurement by using a measurement gap configured in the user equipment.

CITATION LIST

Non Patent Literature

Non Patent Literature 1: 3 GPP Contribution "R1-2100230"

SUMMARY OF INVENTION

A communication apparatus according to an aspect of the present disclosure comprises: a communicator configured to receive, from a base station, information indicating an absolute radio frequency channel number of a synchronization signal and a physical broadcast channel block (SSB) together with information indicating a dedicated parameter used for communication in a downlink bandwidth part; and a controller configured to perform measurement using the SSB based on the information indicating the absolute radio frequency channel number.

A base station according to an aspect of the present disclosure comprises: a communicator configured to transmit, to a communication apparatus, information indicating an absolute radio frequency channel number of a synchronization signal and a physical broadcast channel block (SSB) together with information indicating a dedicated parameter used for communication in a downlink bandwidth part. The communicator is configured to transmit the SSB to the communication apparatus based on the absolute radio frequency channel number.

A communication method according to an aspect of the present disclosure is executed by a communication apparatus. The communication method comprising the steps of: receiving, from a base station, information indicating an absolute radio frequency channel number of a synchronization signal and a physical broadcast channel block (SSB) together with information indicating a dedicated parameter used for communication in a downlink bandwidth part; and performing measurement using the SSB based on the information indicating the absolute radio frequency channel number.

A communication method according to an aspect of the present disclosure is executed at a base station. The communication method comprising the steps of: transmitting, to a communication apparatus, information indicating an absolute radio frequency channel number of a synchronization signal and a physical broadcast channel block (SSB) together with information indicating a dedicated parameter used for communication in a downlink bandwidth part; and transmitting the SSB to the communication apparatus based on the absolute radio frequency channel number.

BRIEF DESCRIPTION OF DRAWINGS

Objects, features, advantages, and the like of the present disclosure will become more apparent from the following detailed description with reference to the accompanying drawings.

DESCRIPTION OF EMBODIMENTS

Figure 1:
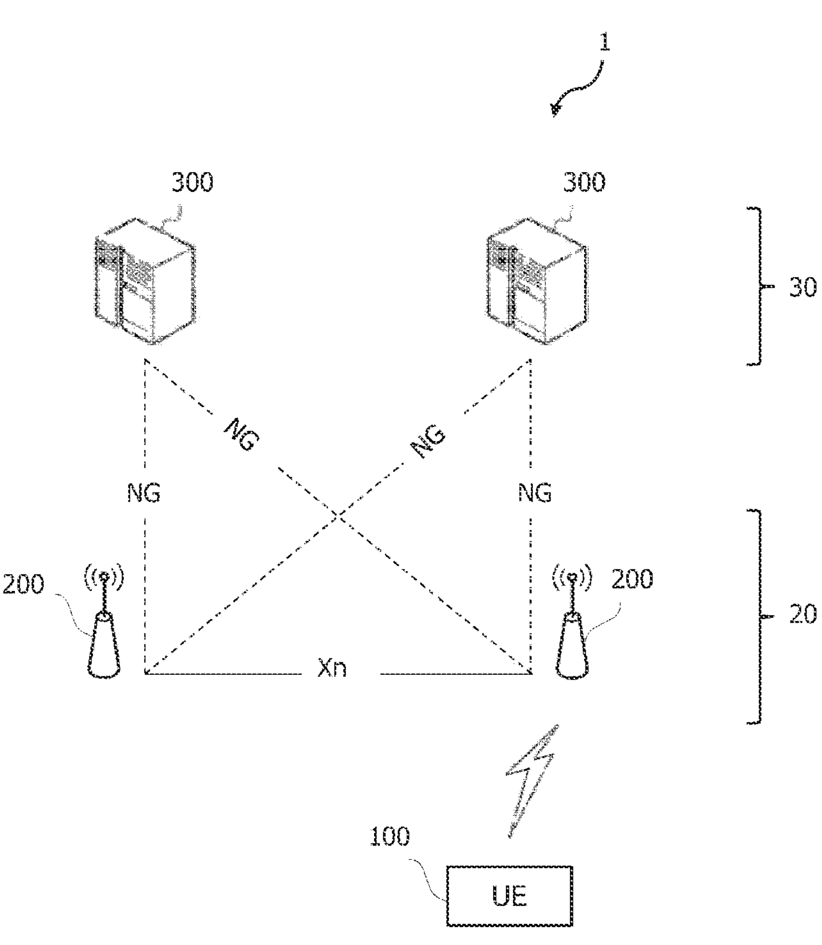
FIG. 1 is an explanatory diagram illustrating an example of a schematic configuration of a system according to an embodiment of the present disclosure.

Hereinafter, embodiments of the present disclosure will be described in detail with reference to the accompanying drawings. Note that, in the present specification and the drawings, elements that can be described in a similar manner are denoted by the same or similar reference numerals, and redundant description can be omitted.

When performing measurement on the SSB by using the measurement gap, there is a problem that a data rate of communication with the base station decreases because the user equipment needs to suspend communication with the base station during a period of the measurement gap. Therefore, an object of the present disclosure is to provide a communication apparatus, a base station, and a communication method capable of suppressing a decrease in a data rate even when a BWP in which an SSB is not transmitted is configured.

(1) System Configuration (1.1) System Overview

An example of a configuration of a system 1 according to an embodiment of the present disclosure will be described with reference to FIG. 1. The system 1 is, for example, a mobile communication system conforming to technical specifications (Technical specification (TS)) of 3GPP which is a mobile communication system standardization project. Hereinafter, as the system 1, a 5th generation system (5th Generation System (5GS)) of the 3GPP standard, that is, a mobile communication system based on NR (New Radio) will be described as an example. Note that the system 1 is not limited to this example. The system 1 may be a system conforming to a TS of LTE (Long Term Evolution) or another generation system (for example, the sixth generation) of the 3GPP standard. The system 1 may be a system conforming to TS of a standard other than the 3GPP standard.

As illustrated in FIG. 1, a system 1 includes a 5G radio access network (so-called Next Generation Radio Access Network (NG-RAN)) 20, a 5G core network (5G Core Network (5GC)) 30, and user equipment (User Equipment (UE)) 100.

The NG-RAN 20 includes a base station (Base Station (BS)) 200 that is a node of a radio access network. The BS 200 may communicate with a UE 100 located within a coverage area of the BS 200. The BS 200 communicates with the UE 100 using, for example, a protocol stack of the RAN. The protocol stack includes, for example, a RRC (Radio Resource Control) layer, a SDAP (Service Data Adaptation Protocol) layer, a PDCP (Packet Data Convergence Protocol) layer, a RLC (Radio Link Control) layer, a MAC (Medium Access Control) layer, and a physical (Physical (PHY)) layer. However, in the case of LTE, there may be no SDAP layer.

The BS 200 is, for example, a gNB that provides an NR user plane and control plane protocol terminations towards the UE 100 and is connected to the 5GC 30 via an NG interface. Note that the BS 200 may be, for example, an eNB that provides E-UTRA user plane and control plane protocol terminations toward the UE 100 in LTE.

The BS 200 may include a plurality of units. The plurality of units may include a first unit that hosts a higher layer (higher layer) included in the protocol stack and a second unit that hosts a lower layer (lower layer) included in the protocol stack. The higher layer may include an RRC layer, an SDAP layer, and a PDCP layer, and the lower layer may include an RLC layer, a MAC layer, and a PHY layer. The first unit may be a CU (Central Unit), and the second unit may be a DU (Distributed Unit). The plurality of units may include a third unit that performs processing below the PHY layer. The second unit may perform processing above the PHY layer. The third unit may be a RU (Radio Unit). The BS 200 may be one of the plurality of units and may be connected to another unit of the plurality of units. Furthermore, the BS 200 may be an IAB (Integrated Access and Backhaul) donor or an IAB node.

The 5GC 30 includes a core network apparatus 300. The core network apparatus 300 includes, for example, an AMF (Access and Mobility Management Function) and/or a UPF (User Plane Function). The AMF performs mobility management of the UE 100. The UPF provides a function specialized for U-plane processing. The AMF and the UPF are connected to the BS 200 via an NG interface.

The UE 100 may communicate with the BS 200 when located within the coverage area of the BS 200. The UE 100 may communicate with the BS 200 using the protocol stack described above.

The UE 100 is an example of a communication apparatus that communicates with the base station 200. The UE 100 may be an apparatus used by a user. The UE 100 is, for example, a mobile radio communication apparatus such as a mobile phone terminal such as a smartphone, a tablet terminal, a notebook PC, a communication module, or a communication card. Furthermore, the UE 100 may be a vehicle (for example, a car, a train, or the like) or an apparatus provided in the vehicle. The UE 100 may be a transport body other than a vehicle (for example, a ship, an airplane, or the like) or an apparatus provided in the transport body other than a vehicle. Furthermore, the UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The UE 100 may be user equipment (so-called reduced capability NR device (RedCap UE)) with limited communication capability. The RedCap UE may be, for example, a UE with reduced equipment cost and complexity as compared with UEs that meet Rel-15 or Rel-16 high performance, enhanced mobile broadband (enhanced Mobile Broadband (eMBB)) and ultra-reliable low latency (ultra-reliable and low latency communications (URLLC)). The RedCap UE may be capable of communicating at a communication speed higher than or equal to a communication speed defined by a LPWA (Low Power Wide Area) standard (for example, LTE Cat.1/1bis, LTECat.M1 (LTE-M), LTE-Cat.NB1 (NB-IoT)). The RedCap UE may be communicable with a bandwidth greater than or equal to the bandwidth specified in the LPWA standard. The RedCap UE may have a limited bandwidth used for communication as compared with the UE of Rel-15 or Rel-16. In FR1 (Frequency Range 1), for example, the maximum bandwidth of the RedCap UE may be 20 MHz, and may be 40 MHz under predetermined conditions. In FR2 (Frequency Range 2), for example, the maximum bandwidth of the RedCap UE may be 100 MHz. The RedCap UE may have only one receiver (so-called Rx chain) that receives a radio signal. The RedCap UE may be, for example, an industrial wireless sensor, a video surveillance apparatus, or a wearable apparatus.

(1.2) Configuration of User Equipment

Figure 2:
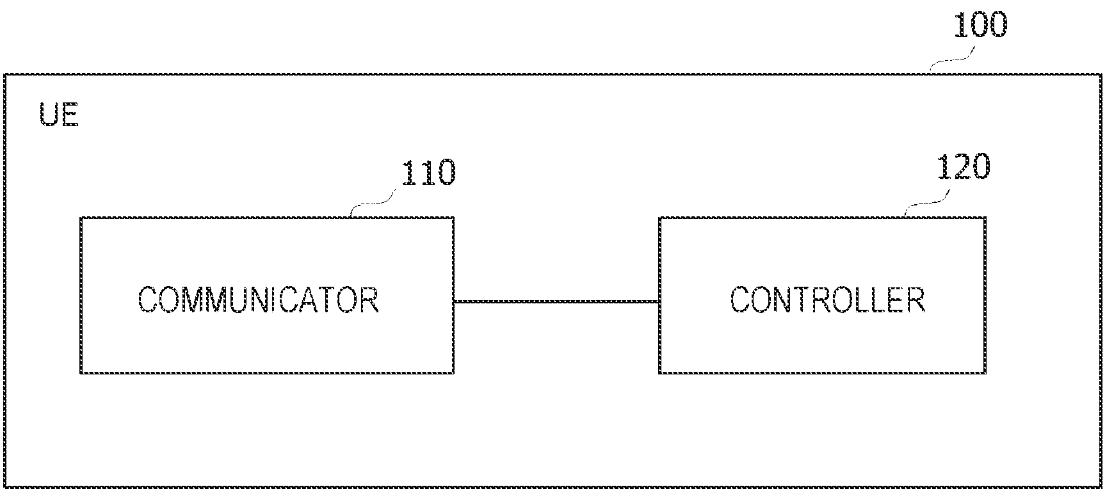
FIG. 2 is a block diagram illustrating an example of a schematic functional configuration of user equipment according to an embodiment of the present disclosure.

An example of a configuration of the UE 100 according to the embodiment of the present disclosure will be described with reference to FIG. 2. The UE 100 includes a communicator 110 and a controller 120.

The communicator 110 communicates with other communication apparatuses by transmitting and receiving signals. For example, the communicator 110 receives a radio signal from the BS 200 and transmits a radio signal to the BS 200. Furthermore, for example, the communicator 110 may receive a radio signal from another UE and transmit a radio signal to another UE.

The communicator 110 may include one or more receivers that receive radio signals and one or more transmitters that transmit radio signals. Hereinafter, a configuration in which the communicator 110 includes only one receiver is mainly assumed. The receiver and the transmitter may include an antenna and an RF circuit. The antenna converts a signal into a radio wave and emits the radio wave into space. Furthermore, the antenna receives a radio wave in space and converts the radio wave into a signal. The antenna may include a transmitting antenna and a receiving antenna. The antenna may include an antenna for transmission and reception. The antenna may include a plurality of antenna elements. The RF circuit performs analog processing of a signal transmitted and received via the antenna. The RF circuit may include a high frequency filter, an amplifier, a modulator, a low pass filter, and the like.

The controller 120 performs various controls in the UE 100. The controller 120 controls, for example, communication with the BS 200 or another UE 100 via the communicator 110. An operation of the UE 100 to be described later may be an operation under the control of the controller 120.

The controller 120 may include one or more processors capable of executing a program, and a memory that stores the program. The one or more processors may execute the program to perform the operation of the controller 120. The program may be a program for causing the processor to execute the operation of the controller 120.

The processor performs digital processing of signals transmitted and received via the antenna and the RF circuit. The digital processing includes processing of a protocol stack of the RAN. The processor may be a single processor. The processor may include a plurality of processors. The plurality of processors may include a baseband processor that performs digital processing and one or more processors that perform other processing. The memory stores a program executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. All or a part of the memory may be included in the processor.

Note that, in the following, an operation of a functional unit (specifically, the communicator 110 and the controller 120) included in the UE 100 may be described as an operation of the UE 100.

(1.3) Configuration of Base Station

Figure 3:
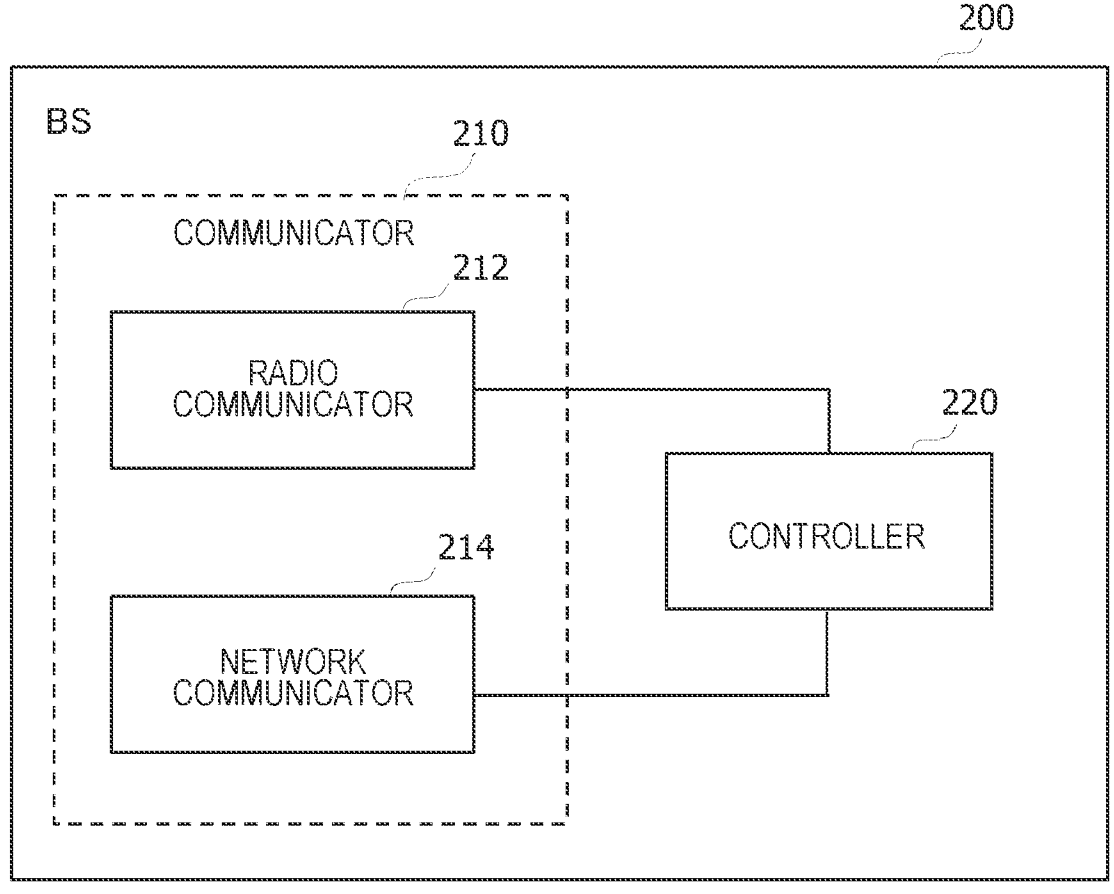
FIG. 3 is a block diagram illustrating an example of a schematic functional configuration of a base station according to an embodiment of the present disclosure.

An example of a configuration of the BS 200 according to the embodiment of the present disclosure will be described with reference to FIG. 3. The BS 200 includes a communicator 210 and a controller 220.

The communicator 210 communicates with other communication apparatuses by transmitting and receiving signals. The communicator 210 includes a radio communicator 212 and a network communicator 214.

The radio communicator 212 transmits and receives signals from the radio communication apparatus. For example, the radio communicator 212 receives a radio signal from the UE 100 and transmits a radio signal to the UE 100. The radio communicator 212 may include one or more receivers that receive radio signals and one or more transmitters that transmit radio signals. The receiver and the transmitter may include an antenna and an RF circuit. The antenna converts a signal into a radio wave and emits the radio wave into space. Furthermore, the antenna receives a radio wave in space and converts the radio wave into a signal. The antenna may include a transmitting antenna and a receiving antenna. The antenna may include an antenna for transmission and reception. The antenna may be a directional antenna. The antenna may include a plurality of antenna elements. The RF circuit performs analog processing of a signal transmitted and received via the antenna. The RF circuit may include a high frequency filter, an amplifier, a modulator, a low pass filter, and the like.

The network communicator 214 transmits and receives signals from a network. The network communicator 214 receives a signal from an adjacent base station connected via an Xn interface which is an interface between bases stations, for example, and transmits the signal to the adjacent base station. Furthermore, the network communicator 214 receives a signal from the core network apparatus 300 connected via the NG interface, for example, and transmits the signal to the core network apparatus 300. The network communicator 214 may include a network interface. The network interface is, for example, a network adapter.

The controller 220 performs various types of control in the BS 200. The controller 220 controls, for example, communication with the UE 100 via the radio communicator 212. Furthermore, the controller 220 controls communication with a node (for example, a network node in a core network, an adjacent base station, or a core network apparatus 300) via the network communicator 214, for example. An operation of the BS 200 to be described later may be an operation under the control of the controller 220.

The controller 220 may include one or more processors capable of executing a program, and a memory that stores the program. The one or more processors may execute the program to perform the operation of the controller 220. The program may be a program for causing the processor to execute the operation of the controller 220.

The processor performs digital processing of signals transmitted and received via the antenna and the RF circuit. The digital processing includes processing of a protocol stack of the RAN. The processor may be a single processor. The processor may include a plurality of processors. The plurality of processors may include a baseband processor that performs digital processing and one or more processors that perform other processing. The memory stores a program executed by the processor, a parameter related to the program, and data related to the program. The memory may include at least one of a ROM, an EPROM, an EEPROM, a RAM, and a flash memory. All or a part of the memory may be included in the processor.

A part or all of the controller 220 may be virtualized. That is, a part or all of the controller 220 may be implemented as a virtual machine. In this case, a part or all of the controller 220 may operate as a physical machine (that is, hardware) including a processor, a memory, and the like and as a virtual machine on a hypervisor.

Note that, hereinafter, the operation of the functional units (the communicator 210 and the controller 220) included in the BS 200 may be described as the operation of the BS 200.

(1.4) BWP (Bandwidth Part)

The UE 100 and the BS 200 perform communication using a BWP (bandwidth part) which is a subset of the total bandwidth of the cell. Specifically, the BS 200 configures one or more BWPs for the UE 100. The BS 200 can notify the UE 100 of the BWP (that is, the active BWP) used for communication with the BS 200 among the configured one or more BWPs. Specifically, the BS 200 can transmit, to the UE 100, an identifier indicating a BWP to be activated at the time of performing the configuration, that is, a BWP to be first used in communication with the BS 200. Furthermore, for control of switching from the active BWP to a BWP that is not the active BWP (hereinafter, inactive BWPs) and switching from the inactive BWP to the active BWP (so-called BWP switching), for example, a physical downlink control channel (for example, downlink assignment, uplink assignment), a timer (that is, bwp-InactivityTimer), RRC signaling, a MAC entity, or the like is used.

The BWP includes an initial BWP and a dedicated BWP. The initial BWP is used at least for initial access of the UE 100. The initial BWP is commonly used by a plurality of UEs 100. The initial BWP includes an initial BWP for downlink communication (hereinafter, initial downlink BWP (Initial Downlink BWP)) and an initial BWP for uplink communication (hereinafter, an initial uplink BWP (Initial Uplink BWP)). A value of the identifier (that is, bwp-id) indicating each of the initial downlink BWP and the initial uplink BWP is 0.

The UE 100 can determine the initial BWP (that is, the initial downlink BWP and the initial uplink BWP) by two methods, for example. In the first method, the UE 100 determines the initial BWP based on CORESET #0 configured using information included in a master information block (MIB) in a physical broadcast channel (PBCH). In the second method, the UE 100 determines the initial BWP based on a frequency domain location and bandwidth configured using information included in a system information block (SIB). For example, the UE 100 may apply the BWP determined by the first method to the communication with the BS 200 until the reception of a message 4 in the random access procedure. For example, after receiving the message 4 (Msg.4), the UE 100 may apply the BWP determined by the second method to the communication with the BS 200.

The dedicated BWP is dedicatedly configured for the UE 100. The dedicated BWP includes a dedicated BWP for downlink communication (hereinafter, a dedicated downlink BWP (UE dedicated Downlink BWP)) and a dedicated BWP for uplink communication (hereinafter, a dedicated uplink BWP (UE dedicated Uplink BWP)). A value of the identifier indicating each of the dedicated downlink BWP and the dedicated uplink BWP is other than 0.

In the UE 100, for example, a dedicated BWP is configured on the basis of information (for example, information for the downlink BWP (that is, BWP-Downlink) and information for the uplink BWP (that is, BWP-Uplink)) included in the RRC message. Each of the information for the downlink BWP and the information for the dedicated uplink BWP may include, for example, at least one of information (for example, locationAndBadwidth) indicating a frequency domain location and bandwidth, information (for example, subcarrierSpacing) indicating a subcarrier spacing, and information (for example, cyclicPrefix) indicating whether an extended cyclic prefix is used.

(1.5) Synchronization Signal and Physical Broadcast Channel Block (SSB)

The SSB includes four OFDM symbols in the time domain and 240 consecutive subcarriers in the frequency domain. The SSB includes a primary synchronization signal (hereinafter, a PSS), a secondary synchronization signal (hereinafter, an SSS), and a physical broadcast channel (PBCH). Each of the PSS and the SSS occupies one OFDM symbol and 127 subcarriers. The PBCH spans three OFDM symbols and 240 subcarriers. The location of the resource element to which the SSB is mapped is specified in the specification.

The BS 200 transmits the SSB in an initial BWP (specifically, an initial downlink BWP). The BS 200 can periodically transmit the SSB. The UE 100 can receive (that is, detects) the SSB transmitted from the BS 200 in the initial downlink BWP, and synchronize the time and/or the frequency.

(1.6) Measurement

The UE 100 can perform measurement based on a radio signal received from the BS 200. For example, the UE 100 measures radio quality (for example, received power (so-called SS reference signal received power (SS-RSRP)), reception quality (so-called SS reference signal received quality (SS-RSRQ)), and the like) based on the SSB. Furthermore, the UE 100 may measure the radio quality (for example, received power (so-called CSI reference signal received power (CSI-RSRP)), reception quality (so-called CSI reference signal received quality (CSI-RSRQ)), and the like) on the basis of, for example, a channel state information reference signal (hereinafter, CSI-RS). The CSI-RS is transmitted on a resource (hereinafter, a CSI-RS resource) dedicatedly configured in the UE 100. The CSI-RS resource can be configured to both the initial BWP and the dedicated BWP.

The UE 100 may use a measurement result for communication control with the BS 200. Furthermore, the UE 100 may report the measurement result to the BS 200. When performing the measurement based on the SSB, the UE 100 may report, for example, a measurement result for each SSB, a measurement result for each cell based on the SSB, and/or the SSB index. Furthermore, when performing the measurement based on the CSI-RS, the UE 100 may report, for example, a measurement result for each CSI-RS resource, a measurement result for each cell based on the CSI-RS resource, and/or a CSI-RS resource identifier. The UE 100 may report the measurement result periodically or by using a predetermined event as a trigger. The UE 100 may report the measurement result in a physical uplink shared channel (PUSCH) in the uplink BWP, for example.

Note that, when receiving request information of a measurement gap from the UE 100 regarding the measurement (SSB based intra-frequency measurement) based on the SSB at a frequency included in a frequency range of a cell, the BS 200 may configure the measurement gap according to the request information. In a case where the BS 200 has not received the request information from the UE 100 and none of the plurality of BWPs configured for the UE 100 includes the frequency domain resource of the SSB associated with the initial BWP other than the initial BWP, the BS 200 may always provide the configuration of the measurement gap to the UE 100.

(2) System Operation (2.1) Operation Example 1

Figure 4:
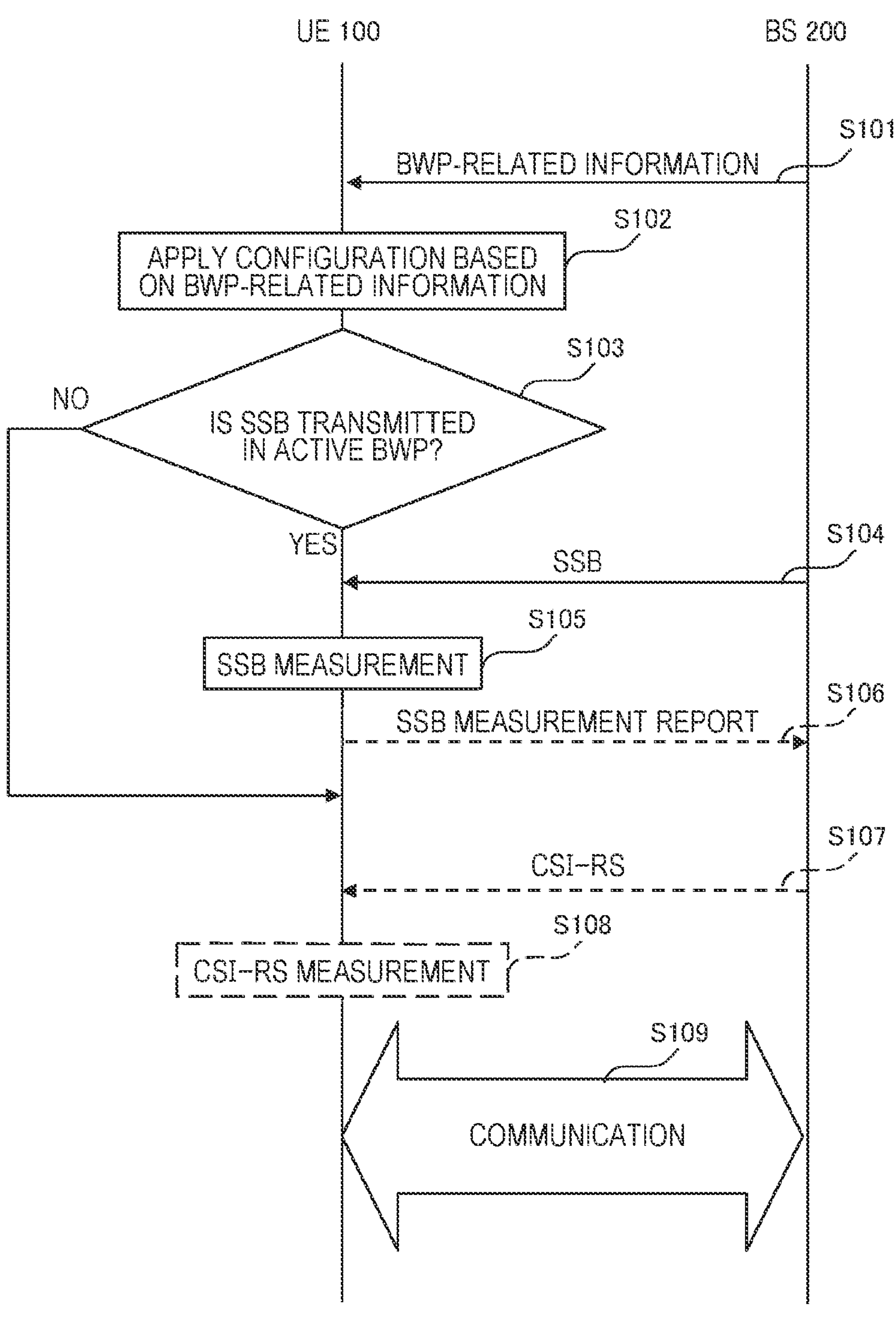
FIG. 4 is a flowchart for explaining an example of a schematic flow of processing according to Operation Example 1 of an embodiment of the present disclosure.

Operation Example 1 of the UE 100 and the BS 200 according to the embodiment of the present disclosure will be described with reference to FIG. 4. The UE 100 is located in a serving cell managed by the BS 200. The UE 100 communicates with the BS 200 by the serving cell.

In step S101, the BS 200 transmits BWP-related information for configuring the BWP. The UE 100 receives the BWP-related information from the BS 200.

The BWP-related information may include information for configuring the initial BWP or information for configuring the dedicated BWP. The BS 200 may transmit the BWP-related information for configuring the initial BWP using the MIB and/or the SIB (for example, SIB1). The BS 200 may transmit the BWP-related information for configuring the dedicated BWP by using dedicated RRC signaling (for example, RRCSetup, RRCResume, RRCReestablishment, and the like).

The BWP-related information may include, for example, at least one of information indicating a frequency domain location and bandwidth (for example, locationAndBadwidth), information indicating a subcarrier spacing (for example, subcarrierSpacing), information indicating whether an extended cyclic prefix is used (for example, cyclicPrefix), information indicating a parameter commonly applied to communication in the initial downlink BWP, and information indicating a parameter commonly applied to communication in the initial uplink BWP. Furthermore, the BWP-related information may include information for configuring the dedicated BWP (that is, the dedicated downlink BWP and/or the dedicated uplink BWP). The information for configuring the dedicated BWP may include at least one of information (for example, bwp-id) for identifying the BWP, information indicating a parameter commonly applied to communication in the dedicated downlink BWP, information indicating a parameter dedicatedly applied to communication in the dedicated downlink BWP, information indicating a parameter commonly applied to communication in the dedicated uplink BWP, and information indicating a parameter dedicatedly applied to communication in the dedicated uplink BWP.

The BWP-related information may include information (Hereinafter, it is appropriately referred to as omission information.) indicating that omission of measurement using the SSB is allowed. The BS 200 may transmit the omission information using the PDCCH, the RRC signaling, or the MAC message. For example, in MeasConfig in RRCReconfiguration, the BS 200 may instruct to permit the omission of the measurement in a predetermined bit. Note that the BS 200 may transmit the omission information at a timing different from step S101. The UE 100 may omit the measurement according to the omission information. Note that the UE 100 may perform the measurement (as necessary) even in a case where the omission of the measurement is allowed.

Note that the BS 200 may transmit, to the UE 100, the configuration information for measuring the SSB together with the BWP-related information, or may transmit, to the UE 100, the configuration information for measuring the SSB separately from the BWP-related information. The configuration information for measurement may include, for example, information (for example, an absolute radio frequency channel number (ARFCN) or the like) indicating a frequency at which the SSB is transmitted, as the information indicating a measurement object.

Note that, in a case where the frequency domain resource of the SSB associated with the initial BWP is not included in any of the plurality of BWPs dedicatedly configured for the UE 100 other than the initial BWP, the BS 200 may determine whether or not the UE 100 supports communication in the BWP in which the SSB is not transmitted. For example, the BS 200 can determine whether or not the UE 100 supports communication in the BWP in which the SSB is not transmitted on the basis of capability information received from the UE 100. For example, in a case where the capability information received from the UE 100 includes information indicating support of a BWP operation without bandwidth restriction (for example, bwp-WithoutRestriction), the BS 200 may determine that the UE 100 supports communication in the BWP in which the SSB is not transmitted. In this case, the BS 200 may configure the BWP in which the SSB is not transmitted to the UE 100. Note that the bandwidth restriction means, for example, that the SSB may not be transmitted in the bandwidth of the downlink BWP dedicatedly configured for the UE 100.

When determining that the UE 100 does not support communication in the BWP in which the SSB is not transmitted, the BS 200 may always provide the configuration of the measurement gap to the UE 100. On the other hand, when determining that the UE 100 supports communication in the BWP in which the SSB is not transmitted, the BS 200 may omit the configuration of the measurement gap for the UE 100.

Note that, in a case where the downlink BWP dedicatedly configured for the UE 100 includes the dedicated downlink BWP in which the SSB is not transmitted, the BS 200 may configure, in the UE 100, measurement using the CSI-RS resource included in the dedicated downlink BWP in which the SSB is not transmitted. The BS 200 may transmit the configuration information of the measurement to the UE 100 together with the BWP-related information. The BS 200 may transmit the measurement configuration information to the UE 100 separately from the BWP-related information.

In step S102, the UE 100 applies the configuration based on the BWP-related information in order to communicate with the BS 200 in the BWP. The UE 100 can determine the BWP to be used as the active BWP among the configured one or more BWPs on the basis of the BWP-related information.

In step S103, the UE 100 determines whether or not the SSB is transmitted in the active BWP, specifically, the downlink BWP (hereinafter, the active downlink BWP) configured as the active BWP. That is, the UE 100 determines whether or not the active downlink BWP includes the SSB of the serving cell. When determining that the SSB is transmitted in the active downlink BWP (YES), the UE 100 executes processing of step S105. On the other hand, when determining that the SSB is not transmitted in the active downlink BWP (NO), the UE 100 executes processing of step S108 or step S109. Therefore, in a case where the SSB is not transmitted from the BS 200 in the active downlink BWP, the UE 100 omits the measurement in step S105.

For example, in a case where the active downlink BWP is the initial BWP, the UE 100 determines that the SSB is transmitted in the active downlink BWP. Furthermore, for example, in a case where the frequency at which the SSB is transmitted is included in the active downlink BWP, on the basis of the information indicating the frequency at which the SSB is transmitted, the UE 100 may determine that the SSB is transmitted in the active downlink BWP. On the other hand, in a case where the frequency at which the SSB is transmitted is not included in the active downlink BWP, the UE 100 determines that the SSB is not transmitted in the active downlink BWP.

For example, in a case where the UE 100 is a RedCap UE having the capability of supporting the BWP operation without bandwidth restriction, the UE 100 may determine whether the SSB is transmitted in the active downlink BWP. In a case where the UE 100 is a RedCap UE that does not have the capability of supporting the BWP operation without bandwidth restriction, or in a case where the UE 100 is a UE other than the RedCap UE, the UE 100 may perform the processing of step S105 according to the measurement configuration from the BS 200 without determining whether the SSB is transmitted in the active downlink BWP.

Note that in a case where the omission information is received from the BS 200, the UE 100 may determine whether or not to omit the measurement according to the omission information. Specifically, the UE 100 may omit the measurement when determining that the SSB is not transmitted in the active downlink BWP and when receiving the omission information (That is, the processing of step S108 or step S109 may be executed.). Even in a case where it is determined that the SSB is not transmitted in the active downlink BWP, the UE 100 does not need to omit the measurement of the SSB in a case where the omission information is not received. In a case where the SSB is not transmitted in the active downlink BWP, the UE 100 performs measurement using the SSB in a frequency other than the active downlink BWP. The UE 100 may request a measurement configuration for performing the measurement from the BS 200. Accordingly, the BS 200 can control the UE 100 that omits the measurement.

In a case where it is determined that the SSB is transmitted in the active downlink BWP, that is, in a case where the active downlink BWP includes the SSB of the serving cell, the UE 100 configures the measurement of the SSB to enable and performs the measurement of the serving cell. On the other hand, in a case where it is determined that the SSB is not transmitted in the active downlink BWP, that is, in a case where the active downlink BWP does not include the SSB of the serving cell, the UE 100 configures the measurement of the SSB to disable and omits the measurement. That is, the UE 100 does not measure the serving cell. Furthermore, in a case where the UE 100 is a RedCap UE having the capability of supporting the BWP operation without bandwidth restriction, and the active downlink BWP does not include the SSB of the serving cell, the UE 100 does not need to perform the measurement of the serving cell.

In step S104, the BS 200 transmits the SSB in the serving cell. Specifically, the BS 200 transmits the SSB in the active downlink BWP configured for the UE 100. As illustrated in FIG. 4, the UE 100 receives the SSB.

In step S105, the UE 100 performs measurement using the SSB in the active downlink BWP. The UE 100 measures the radio quality using, for example, the SSB. The radio quality is, for example, received power of the SSB, reception quality of the SSB, and the like. The UE 100 stores the measurement result in the active downlink BWP. Note that, in a case where the UE 100 is not the RedCap UE having the capability of supporting the BWP operation without bandwidth restriction, the UE 100 may perform the measurement for the serving cell according to the measurement configuration from the BS 200.

In step S106, the UE 100 may report the obtained measurement result to the BS 200. The UE 100 may transmit an SSB measurement report indicating the obtained measurement result to the BS 200. For example, in a case where the report of the measurement result is not configured, the UE 100 may omit the report to the BS 200.

In step S107, the BS 200 may dedicatedly transmit the CSI-RS to the UE 100 in the active downlink BWP.

In step S108, the UE 100 may measure the CSI-RS in a case where the CSI-RS resource is configured from the BS 200. The UE 100 measures the radio quality using, for example, the CSI-RS. The radio quality is, for example, received power of the CSI-RS, reception quality of the CSI-RS, and the like. The UE 100 stores the measurement result in the active downlink BWP. The UE 100 may report the obtained measurement result to the BS 200.

The UE 100 may omit the processing of step S108. For example, in a case where the CSI-RS resource is not configured from the BS 200, the UE 100 may omit the measurement of the CSI-RS.

In step S109, the UE 100 performs communication with the BS 200 in the active BWP. In a case where the measurement is performed using the SSB, the UE 100 uses the measurement result obtained by the measurement for communication control with the BS 200. Furthermore, the UE 100 may use the measurement result obtained by measuring the CSI-RS for communication control with the BS 200. On the other hand, in a case where the SSB is not transmitted from the BS 200 in the active downlink BWP, the UE 100 may perform the downlink communication in the active downlink BWP, for example.

As described above, in a case where the SSB is not transmitted from the BS 200 in the active BWP, the UE 100 omits the measurement using the SSB. Specifically, in the UE 100 according to the embodiment of the present disclosure, the communicator 110 performs communication with the BS 200 in the BWP that is a subset of the total bandwidth of the cell of the BS 200. In a case where the SSB used for measurement of the radio quality is transmitted from the BS 200 in the active BWP which is one BWP used for communication with the BS 200 among one or a plurality of BWPs configured in the user equipment 100, the controller 120 performs measurement using the SSB transmitted in the active BWP. In a case where the SSB is not transmitted from the BS 200 in the active BWP, the controller 120 omits the measurement. As a result, in order for the UE 100 to perform the measurement using the SSB transmitted at a frequency other than the active BWP, the BS 200 does not need to configure the measurement gap, that is, a period in which the communication between the UE 100 and the BS 200 is suspended, in the UE 100. As a result, the communication between the UE 100 and the BS 200 is not suspended, and the data rate of the communication does not decrease.

(2.2) Operation Example 2

Figure 5:
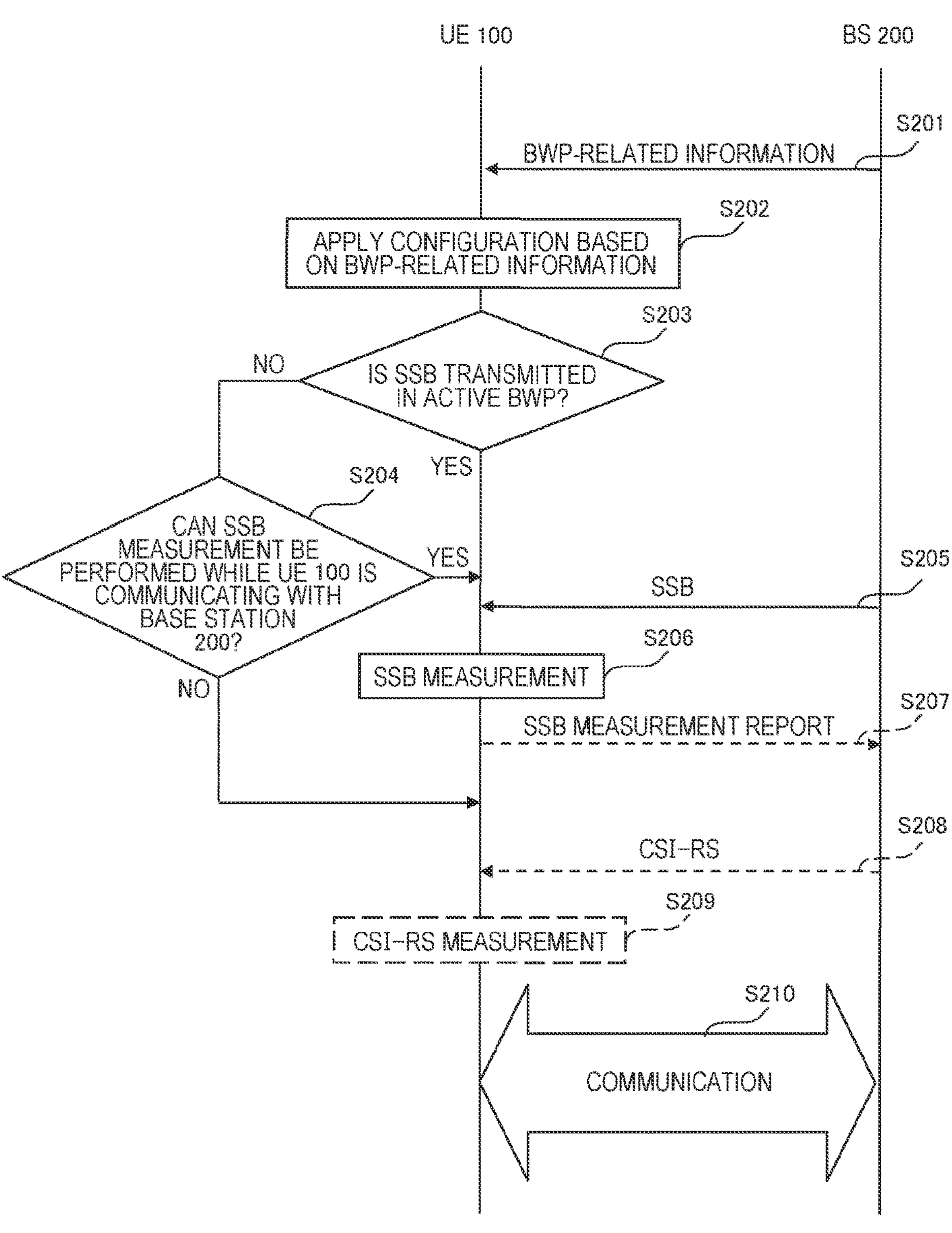
FIG. 5 is a flowchart for explaining an example of a schematic flow of processing according to Operation Example 2 of an embodiment of the present disclosure.

Operation Example 2 of the UE 100 and the BS 200 according to the embodiment of the present disclosure will be described with reference to FIG. 5. Differences from the above-described contents will be mainly described. In Operation Example 2, an example of an operation in which the UE 100 executes the measurement of the SSB without omitting the measurement of the SSB in a case where the UE 100 can perform the measurement using the SSB at a frequency other than the active BWP during the communication with the BS 200 even if the measurement of the SSB can be omitted, for example, in a case where the UE 100 has a plurality of receivers will be described.

Steps S201 to S203 correspond to steps S101 to S103.

In step S204, the UE 100 determines whether or not measurement can be performed using the SSB at a frequency other than the active BWP (specifically, the active downlink BWP) during communication with the BS 200. In a case where the UE 100 can perform the measurement during the communication with the BS 200, the UE 100 executes processing of step S206. In a case where the UE 100 cannot perform the measurement during the communication with the BS 200, the UE 100 executes processing of step S209 or step S210. Note that the UE 100 may perform step S204 before step S203. In this case, in a case where the measurement can be performed during the communication with the BS 200, the UE 100 executes the processing of step S206. On the other hand, in a case where the measurement cannot be performed during the communication with the BS 200, the UE 100 determines whether the SSB is transmitted in the active downlink BWP (see step S103).

The UE 100 determines, for example, whether or not to have a plurality of receivers. In a case where the UE 100 includes the plurality of receivers, the UE 100 executes the processing of step S206. In a case where the UE 100 does not have the plurality of receivers, that is, in a case where the UE 100 has a single receiver, the UE 100 executes the processing of step S209 or S210.

In step S206, in a case where the SSB is transmitted in the active downlink BWP, the UE 100 executes the processing of step S105. In a case where the SSB is not transmitted in the active downlink BWP, the UE 100 uses at least one receiver among the plurality of receivers to perform measurement by using the SSB transmitted in a frequency other than the active downlink BWP.

Steps S205 and S207 to S210 correspond to steps S104 to S109.

In step S210, the UE 100 can execute communication with the BS 200 in the active downlink BWP using a receiver other than the receiver used for measuring the SSB in a frequency other than the active downlink BWP among the plurality of receivers. That is, the UE 100 can periodically measure the SSB transmitted at a frequency other than the active downlink BWP while performing communication with the BS 200. The UE 100 can execute communication with the BS 200 using the obtained measurement result.

As described above, in a case where the measurement using the SSB can be performed at the frequency other than the active BWP during the communication with the BS 200, the UE 100 (the controller 120) can use the measurement result obtained by the measurement of the SSB transmitted at the frequency other than the active BWP without omitting the measurement. As a result, the UE 100 can appropriately communicate with the BS 200.

(2.3) Operation Example 3

Figure 6:
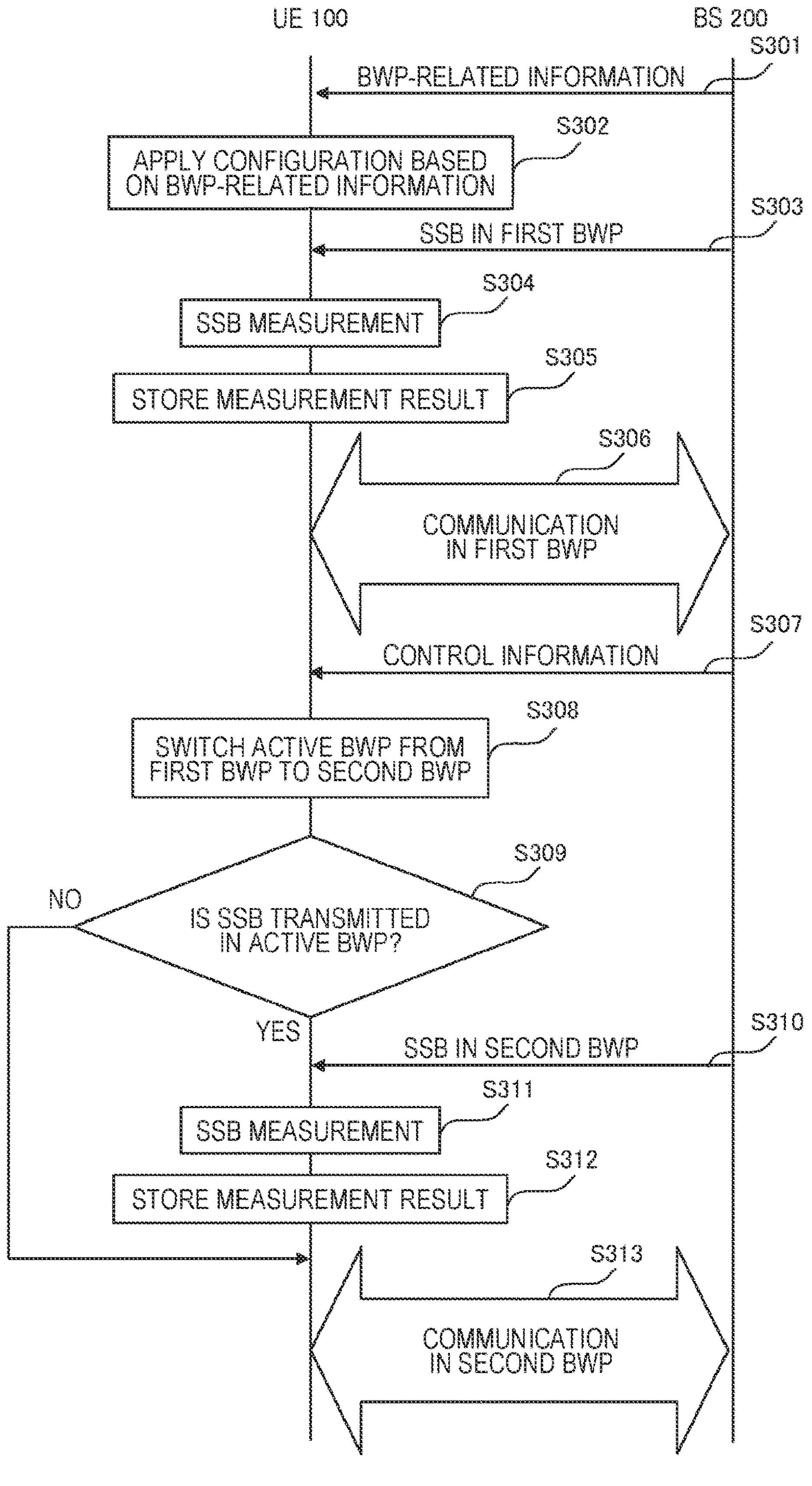
FIG. 6 is a flowchart for explaining an example of a schematic flow of processing according to Operation Example 3 of an embodiment of the present disclosure.

Operation Example 3 of the UE 100 and the BS 200 according to the embodiment of the present disclosure will be described with reference to FIG. 6. Differences from the above-described contents will be mainly described. In Operation Example 3, an example of an operation in which the UE 100 controls communication on the basis of a past measurement result in a case where the active BWP is switched will be described.

Steps S301 and S302 correspond to steps S101 and S102, respectively. In step S302, the UE 100 configures a first BWP and a second BWP based on the BWP-related information. The second BWP is different from the first BWP in the frequency domain location and bandwidth. In the present operation example, the UE 100 configures the first BWP as the active BWP. Note that the SSB is transmitted in the first BWP. In the following description, it is assumed that the UE 100 determines that the SSB is transmitted in the active BWP.

Steps S303 and S304 correspond to steps S104 and S105, respectively.

In step S305, the UE 100 stores the measurement result.

In step S306, the UE 100 performs communication with the BS 200 in the first BWP. The UE 100 controls communication based on the stored measurement result. The UE 100 may periodically perform the measurement using the SSB during the communication period with the BS 200 in the first BWP. When performing the measurement a plurality of times, the UE 100 may store a plurality of measurement results. The UE 100 may store the measurement result in association with the information of the measurement time. Alternatively, when performing the measurement a plurality of times, the UE 100 may update (that is, overwrite) the stored measurement result to the latest measurement result.

In step S307, the BS 200 transmits control information for switching the active BWP to the UE 100. The BS 200 transmits the control information to the UE 100 using, for example, a physical downlink control channel or RRC signaling. The control information may be, for example, information designating the active BWP. In the present operation example, the control information may include information for switching the active BWP from the first BWP to the second BWP.

In step S308, the UE 100 switches the active BWP from the first BWP to the second BWP. The UE 100 may switch the active BWP from the first BWP to the second BWP in response to the reception of the control information from the BS 200. For example, according to the control information, the UE 100 changes the configured first BWP from the active BWP to the inactive BWP and changes the configured second BWP from the inactive BWP to the active BWP.

Steps S309 to S311 correspond to steps S103 to S105.

Note that, in step S309, for example, in a case where the first BWP is not the initial BWP, the UE 100 may execute processing of step S310. For example, in a case where the first BWP is the initial BWP, the UE 100 may execute processing of step S313.

In step S312, the UE 100 stores the measurement result. The UE 100 may store the measurement result in the second BWP while storing the measurement result in the first BWP. Alternatively, the UE 100 may discard the measurement result in the first BWP. The UE 100 may store the measurement result in the second BWP as the latest measurement result. That is, the UE 100 may update (that is, overwrite) the stored measurement result to the latest measurement result.

In step S313, the UE 100 performs communication with the BS 200 in the second BWP. The UE 100 controls communication based on the stored measurement result.

In a case where the UE 100 (the controller 120) performs the measurement in step S311, the UE 100 controls the communication based on the measurement result in the second BWP. On the other hand, in a case where the UE 100 (the controller 120) omits the measurement in step S311, the UE 100 controls the communication based on the measurement result stored in step S305, that is, the measurement result in the first BWP in which the SSB is transmitted. The UE 100 can appropriately communicate with the BS 200 by using the past measurement result.

In a case where the first BWP is the initial BWP, the UE 100 may control the communication based on the measurement result in the first BWP in which the SSB is transmitted.

In a case where the measurement is omitted, the UE 100 (the controller 120) may control the communication based on the latest measurement result among the stored measurement results. For example, in a case where a plurality of measurement results is stored, the UE 100 performs communication based on the latest measurement result. For example, in a case where the UE 100 considers that the quality of the radio of the first BWP is equal to the quality of the radio of the second BWP because the UE 100 is stationary, the latest measurement result of the first BWP can be regarded as the quality of the radio of the second BWP. As a result, since communication is performed on the basis of the latest measurement result among the measurement results stored in the UE 100, communication with the BS 200 can be more appropriately performed. Note that the UE 100 may determine whether or not the UE 100 is stationary on the basis of, for example, position information acquired by a GPS (Global Positioning System) included in the UE 100.

Note that, in a case where a plurality of BWPs is configured, the UE 100 may store the latest measurement result for each BWP. When storing a plurality of measurement results, the UE 100 may perform communication based on the latest measurement result closest to the frequency of the active BWP.

As is clear from the above description, the communicator 110 of the UE 100 can receive the information indicating the absolute radio frequency channel number of the SSB together with the information indicating the dedicated parameter used for the communication in the downlink BWP from the BS 200. The controller 120 of the UE 100 can perform measurement using the SSB based on the information indicating the absolute radio frequency channel number.

Furthermore, the controller 120 may perform measurement in a case where the downlink BWP is the active downlink bandwidth part.

Moreover, the communicator 110 may receive information indicating the frequency domain location and bandwidth for configuring the downlink BWP. The communicator 110 may receive the SSB in the downlink BWP.

Furthermore, the communicator 110 may receive information indicating the frequency domain location and bandwidth together with the information indicating the absolute radio frequency channel number.

Furthermore, the downlink bandwidth part may be a bandwidth part different from the initial bandwidth part. Furthermore, a value of the identifier indicating the downlink bandwidth part may be other than 0.

Furthermore, the UE 100 is described as an example of the communication apparatus. Therefore, the communication apparatus may be user equipment. Furthermore, the communication apparatus may be RedCap user equipment.

Furthermore, as is clear from the above description, the communicator 210 of the BS 200 can transmit the information indicating the absolute radio frequency channel number of the SSB to the UE 100 together with the information indicating the dedicated parameter used for the communication in the downlink BWP. The communicator 210 of the BS 200 may transmit the SSB to the UE 100 based on the absolute radio frequency channel number.

Other Embodiments

Each operation example described above is not limited to the case of being separately and independently performed, and each operation example can be appropriately combined and performed.

Furthermore, for example, the steps in the processing described in the present specification do not necessarily need to be executed in time series in the order described in the flowchart or the sequence diagram. For example, the steps in the processing may be executed in an order different from the order described as the flowchart or the sequence diagram, or may be executed in parallel. Furthermore, some of the steps in the processing may be deleted, and further steps may be added to the processing. Moreover, each operation flow described above is not limited to be separately and independently implemented, and can be implemented by combining two or more operation flows. For example, some steps of one operation flow may be added to another operation flow, or some steps of one operation flow may be replaced with some steps of another operation flow.

For example, a method may be provided that includes operation of one or more components of the apparatus described herein, and a program may be provided to cause a computer to perform the operation of the components. Furthermore, a non-transitory tangible computer-readable storage medium on which the program is recorded may be provided. Such methods, programs, and a non-transitory tangible computer-readable storage medium (non-transitory tangible computer-readable storage medium) are also included in the present disclosure. Furthermore, at least a part of the UE 100 or at least a part of the BS 200 may be a chip set or a SoC (System on Chip) in which circuits that execute respective processing performed by the UE 100 or the BS 200 are integrated.

In the present disclosure, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in the protocol stack used for reception, or may mean to physically receive signals wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The invention claimed is:

1. A communication apparatus comprising:

a receiver configured to receive, from a base station, a radio resource control (RRC) message that includes information for a downlink bandwidth part, the information for the downlink bandwidth part including information on an absolute radio frequency channel number (ARFCN) of a synchronization signal and a physical broadcast channel block (SSB), information indicating a frequency domain location and bandwidth of the downlink bandwidth part, information indicating a dedicated parameter used for the downlink bandwidth part, and information indicating a measurement object for a measurement based on the SSB; and a controller configured to perform the measurement based on the SSB, wherein:

the information on the ARFCN of the SSB indicates a frequency of the SSB so that the SSB is transmitted within a bandwidth of the downlink bandwidth part indicated by the information indicating the frequency domain location and bandwidth of the downlink bandwidth part; and in a case that the downlink bandwidth part is activated, the controller is configured to perform, based on the measurement object indicated by the information indicating the measurement object, the measurement based on the SSB of the activated downlink bandwidth part, the frequency of the SSB being indicated by the information on the ARFCN of the SSB.

2. The communication apparatus according to claim 1, wherein:

the receiver is configured to receive by using the RRC message, from the base station, the RRC message including the information for the downlink bandwidth part and information indicating a subcarrier spacing of the downlink bandwidth part.

3. The communication apparatus according to claim 1, wherein:

the communication apparatus is a Reduced Capability (RedCap) user equipment.

4. A base station comprising:

a transmitter configured to transmit, to a communication apparatus, a radio resource control (RRC) message that includes information for a downlink bandwidth part, the information for the downlink bandwidth part including information on an absolute radio frequency channel number (ARFCN) of a synchronization signal and a physical broadcast channel block (SSB), information indicating a frequency domain location and bandwidth of the downlink bandwidth part, information indicating a dedicated parameter used for the downlink bandwidth part, and information indicating a measurement object for a measurement based on the SSB;

a controller configured to control for the communication apparatus to perform the measurement based on the SSB, wherein:

the information on the ARFCN of the SSB indicates a frequency of the SSB so that the SSB is transmitted within a bandwidth of the downlink bandwidth part indicated by the information indicating the frequency domain location and bandwidth of the downlink bandwidth part, and in a case that the downlink bandwidth part is activated, the controller is configured to control for the communication apparatus to perform, based on the measurement object indicated by the information indicating the measurement object, the measurement based on the SSB of the activated downlink bandwidth part, the frequency of the SSB being indicated by the information on the ARFCN of the SSB.

5. The base station according to claim 4, wherein;

the transmitter is configured to transmit, to the communication apparatus, the RRC message including the information for the downlink bandwidth part and information indicating a subcarrier spacing of the downlink bandwidth part.

6. The base station according to claim 4, wherein:

the communication apparatus is a Reduced Capability (RedCap) user equipment.

7. A communication method executed by a communication apparatus, the communication method comprising the steps of:

receiving, from a base station, a radio resource control (RRC) message that includes information for a downlink bandwidth part, information on an absolute radio frequency channel number (ARFCN) of a synchronization signal and a physical broadcast channel block (SSB), information indicating a frequency domain location and bandwidth of the downlink bandwidth part, information indicating a dedicated parameter used for the downlink bandwidth part, and information indicating a measurement object for a measurement based on the SSB; and performing the measurement based on the SSB, wherein:

the information on the ARFCN of the SSB indicates a frequency of the SSB so that the SSB is transmitted within a bandwidth of the downlink bandwidth part indicated by the information indicating the frequency domain location and bandwidth of the downlink bandwidth part; and in a case that the downlink bandwidth part is activated, performing, based on the measurement object indicated by the information indicating the measurement object, the measurement based on the SSB of the activated downlink bandwidth part, the frequency of the SSB being indicated by the information on the ARFCN of the SSB.

8. The communication method according to claim 7, wherein:

the RRC message includes the information for the downlink bandwidth part and information indicating a subcarrier spacing of the downlink bandwidth part.

9. The communication method according to claim 7, wherein:

the communication apparatus is a Reduced Capability (RedCap) user equipment.

* * * * *